（12）United States Patent
Long et al.

(10) Patent No.: US 6,725,176 B1
(45) Date of Patent: Apr. 20, 2004

(54) LOOP DIAGNOSTICS FOR ADSL SYSTEMS

(75) Inventors: Guozhu Long, Newark, CA (US); Jalil Kamali, San Jose, CA (US); Syed A. Abbas, Fremont, CA (US); Steven R. Blackwell, Huntsville, AL (US)

(73) Assignee: Centilliune Communications, Inc., Fremont, CA (US)

( * ) Notice: Subject to any disclaimer, the term of this patent is extended or adjusted under 35 U.S.C. 154(b) by 62 days.

(21) Appl. No.: 10/056,786

(22) Filed: Jan. 22, 2002

Related U.S. Application Data
(60) Provisional application No. 60/310,144, filed on Aug. 3, 2001.

(51) Int. Cl.[7] ............................. G06F 15/16; H04M 1/24
(52) U.S. Cl. ..................... 702/183; 324/527; 375/222; 379/1.01; 714/712
(58) Field of Search ................................. 324/520, 521, 324/532, 533, 534, 537; 702/59, 183, 184; 709/59; 714/712; 375/222; 379/1.01, 22.08

(56) References Cited

U.S. PATENT DOCUMENTS 6,566,889 B2 * 5/2003 Warke .................... 324/527

OTHER PUBLICATIONS

Krinsky et al., "Systems and methods for establishing a diagnostic transmission mode and communicating over the same", Pub. No.: US 2001/0040918 A1, PubDate: Nov. 15, 2001, Non–provisional of provisional application No. 60/174,865, field on Jan., 7, 2000.*

Ginesi et al., "Loop diagnostic mode for ADSL modems", Pub. No.:US 2003/0063711 A1, PubDate: Apr. 3, 2003, Foreign Application Priority Data: (CA) 2,354,298, Jul. 30, 2001.*

ITU Telecommunication Standardization Sector, Recommendation G.992.2, "Splitterless Asymmetric Digital Subscriber Line (ADSL) Transceivers," 185 pp., Mar. 1999.

ITU T Telecommunication Standardization Sector for ITU, G.994.1, "Handshake Procedures For Digital Subscriber Line (DSL) Transceivers," 47 pp., Jun. 1999.

ITU Telecommunication Standardization Sector, Recommendation G.992.1, "Draft New Recommendation G.992.1: Asymmetrical Digital Subscriber Line (ADSL) Transceivers—Approved," 264 pp., Jul. 1999.

ITU Telecommunication Standardization Sector, Temp Document IC–R15, G.991.2, "Recommendation G.991.2— Single–Pair High–Speed Digital Subscriber Line (SHDSL) Transceivers," 191 pp., Apr. 2001.

ITU Telecommunication Standardization Sector, Temp Document RN–043, "G.gen: G.dmt.bis: G.lite.bis: Loop Diagnostics Messaging protocol," 2 pp., May 2001.

ITU Telecommunication Standardization Sector, Temp Document SC–036, "G.gen: G.dmt.bis: G.lite.bis: Loop Diagnostic mode of the Initialization procedure," 7 pp., Aug. 2001.

* cited by examiner

Primary Examiner—John Barlow
Assistant Examiner—John Le
(74) Attorney, Agent, or Firm—Fenwick & West LLP

(57) ABSTRACT

The present invention provides techniques for performing loop diagnostics in DSL communication systems.

26 Claims, 6 Drawing Sheets

LOOP DIAGNOSTICS FOR ADSL SYSTEMS

RELATED APPLICATIONS

This application claims the benefit of U.S. Provisional Application No. 60/310,144, filed Aug. 3, 2001, which is herein incorporated in its entirety by reference.

FIELD OF THE INVENTION

The invention relates to the field of digital subscriber line (DSL) technology, and more particularly, to techniques for performing loop diagnostics on DSL systems.

BACKGROUND OF THE INVENTION

Generally, there is a need for delivery of broadband services to consumers. One of the more prominent broadband solutions is DSL technology. A popular type of DSL is asymmetric digital subscriber line (ADSL), although other types of DSL are also available (e.g., very high-bit-rate—VDSL, symmetric high-bit-rate—SHDSL, and high-bit-rate—HDSL). Typically, such DSL services are delivered to consumers by the existing copper wire infrastructure. As such, vendors seeking to provide DSL solutions must contend with widely varying line conditions. Loop diagnostic information allows vendors to characterize given line conditions thereby facilitating deployment of DSL services. Loop diagnostic information might include information such as loop attenuation and quiet noise PSD (power spectral density), and other relevant information (e.g., signal to noise ratio).

Availability of such diagnostic information is useful, for example, on links where initialization fails (for whatever reason, such as a defective modem). Likewise, diagnostic information can be useful when link initialization does not fail (such as in the provisioning of new services). The loop diagnostic information may be exchanged during data mode (e.g., SHOWTIME) through messages over a message-based overhead channel when link initialization succeeds. However, when modems are not able to pass user data due to a failed initialization, the data mode approach cannot be used. In addition, the integrity and reliability of the loop diagnostic information obtained and or derived during failed link activation attempts is questionable. Thus, another diagnostic information exchange mechanism is required for such cases.

There is a need, therefore, for a reliable and robust mechanism for collecting and exchanging loop diagnostic information in the event of link activation failure. In a more general sense, there is a need for loop diagnostic techniques that can be used in troubleshooting a communication link.

SUMMARY OF THE INVENTION

The present invention provides techniques for performing loop diagnostics in DSL communication systems. One embodiment includes receiving a probe signal having known transmit characteristics, and determining loop diagnostic information based on the known transmit characteristics and received signal characteristics. Such loop diagnostic information can be useful in a preactivation mode, for example, in troubleshooting link activation failures or otherwise troublesome communication links. Likewise, such diagnostic information can be useful in general troubleshooting mode (regardless of link activation status) in gathering loop characteristics that support configuration and management of the DSL service in an offline loop diagnostic mode.

The features and advantages described in the specification are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter

DETAILED DESCRIPTION OF THE INVENTION

The following discussion is given in the context of an ADSL system. However, the present invention can be employed in other DSL systems as will be apparent in light of this disclosure. As such, the present invention is not intended to be limited to ADSL or any one DSL type.

In systems that begin the ADSL activation process but fail to reach SHOWTIME, the only transport scheme that will have been used successfully on the loop is an initial handshaking procedure such as G.hs (as defined by ITU Recommendation G.994.1). Generally, the system will never even reach the start of the ADSL activation process unless G.hs is functional. Thus, from the perspective of the ADSL training, G.hs can be viewed as a "known good" transport mechanism for the link. This means that the handshake procedure can also be used as a transport mechanism for information such as ADSL activation failure diagnostics.

One concern regarding the use of G.hs for the transport of relatively large volumes of information (e.g., up to 768 octets of loop diagnostic information in each direction) is that the mechanism is slow. At 500 bits/second, each octet requires 16 milliseconds, so the total diagnostic information transfer time would require as much as 30 seconds. However, this should not be an issue in real-world applications, since the transfer will only take place in units that cannot successfully activate an ADSL link anyway, and are otherwise unusable.

Handshaking procedures such as G.hs generally provide a mechanism for specifying system information. In one embodiment of the present invention, ADSL loop diagnostics are added as a branch within the existing G.hs Identification Field. This would allow the ADSL loop diagnostic information to be transferred within a new G.hs session, even if that session were being used to negotiate a fallback to another type of DSL. Thus, a loop diagnostic procedure that produces reliable loop diagnostic information gathering and its exchange to the other side is provided.

System Overview

Figure 1:
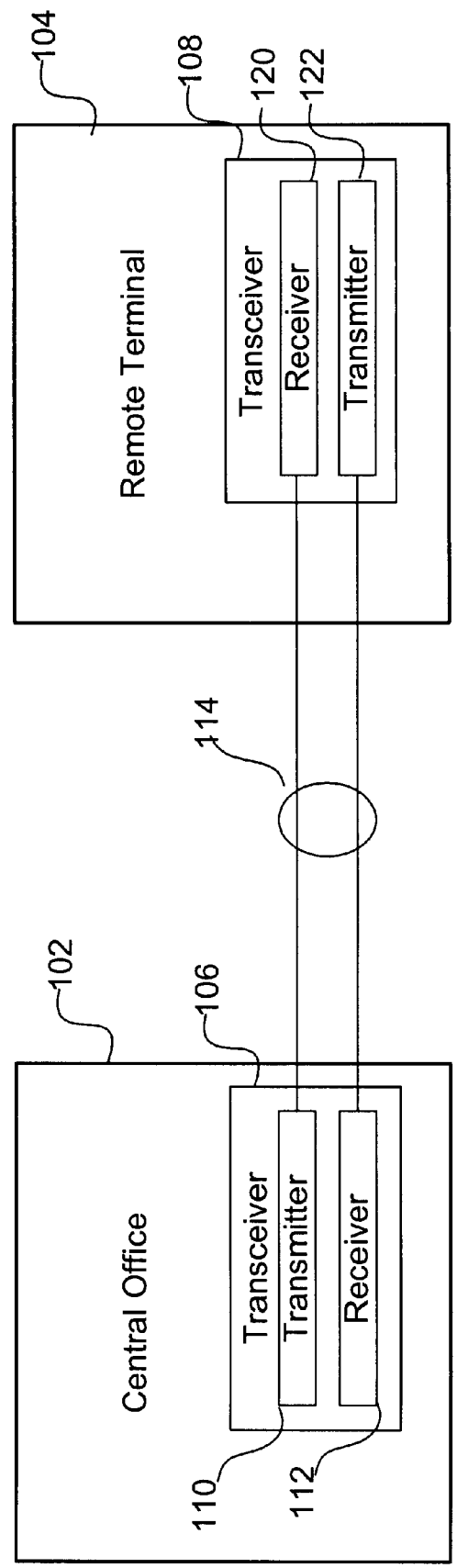
FIG. 1 is a block diagram illustrating an ADSL system on which loop diagnostics can be performed in accordance with an embodiment of the present invention.

FIG. 1 is a block diagram illustrating an ADSL system on which loop diagnostics can be performed in accordance with an embodiment of the present invention. The system includes first 106 and second 108 transceiver units. For purposes of discussion, assume that the first transceiver unit 106 is located at a central office 102 (e.g., ATU-C), and the second transceiver unit 108 is located at a remote terminal location (e.g., ATU-R). Both transceivers include transmitter and receiver sections. The transmitter 110 of the transceiver 106 is communicatively coupled to the receiver 120 of the transceiver 108 via transmission medium 114. Likewise, the transmitter 122 of the transceiver 108 is communicatively coupled to the receiver 112 of the transceiver 106 via transmission medium 114.

The transmission medium 114 is typically a copper wire loop or twisted pair. However, the present invention will operate with other transmission medium types as well (e.g., coaxial cable). The transmission medium 114 is associated with a variety of signal response characteristics, such as loop loss, noise PSD, and signal to noise ratio (SNR). These characteristics generally vary with the frequency at which they are measured. It is therefore possible to associate loop characteristics with a particular frequency range (e.g., one or more frequency bins) included in the overall spectral range of the transmission medium 114. The useful spectral range of a copper loop for ADSL transmission typically ranges from DC to about 1.1 MHz. Given a multiple carrier modulation scheme (e.g., discrete multitone modulation), this range can be subdivided into a number of frequency bins or subchannels to maximize the transmission bandwidth.

Figure 2:
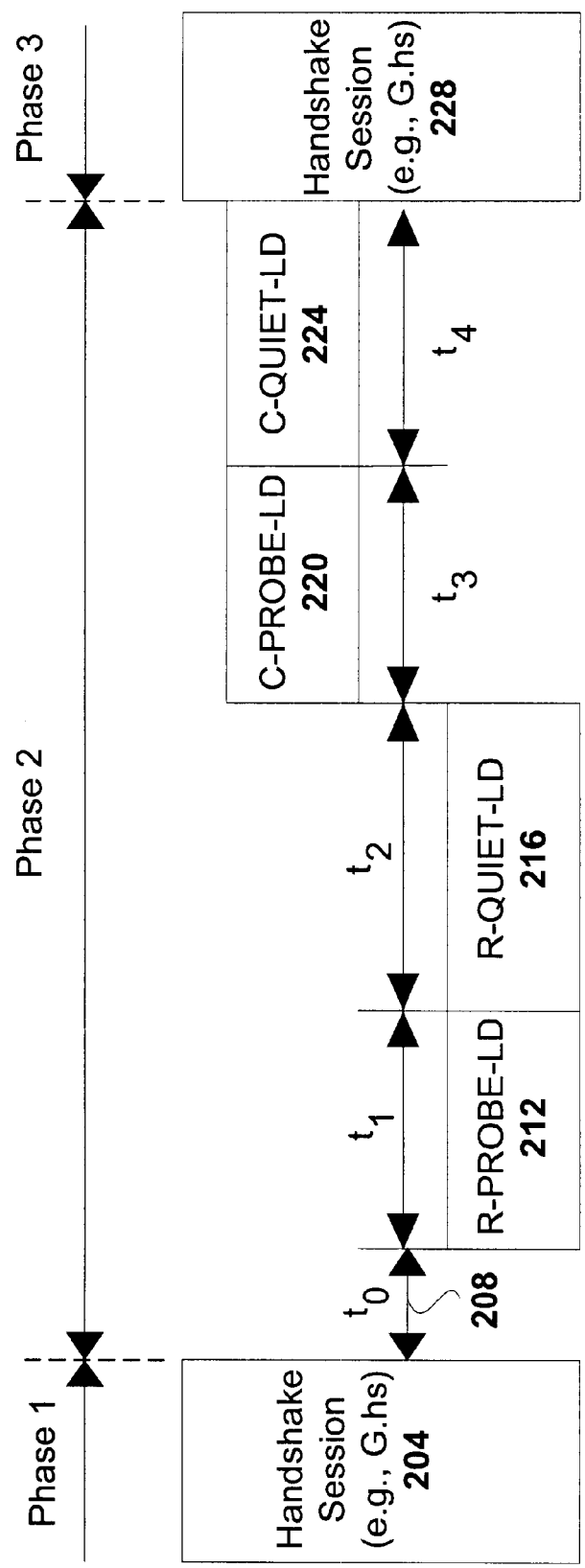
FIG. 2 is a diagram illustrating a model of a loop diagnostic sequence performed in accordance with one embodiment of the present invention.

The functionality of the system can be best understood in reference to the loop diagnostic sequence model illustrated in FIG. 2.

Loop Diagnostic Sequence

FIG. 2 is a diagram illustrating a model of a loop diagnostic sequence performed in accordance with one embodiment of the present invention. This sequence can be exchanged by a transceiver pair (one remote and one local). The sequence can be considered in three phases. The first phase includes a handshake session 204, such as a G.hs session. During this session transceivers 106 and 108 exchange characteristics of diagnostic probe signals that will be used during phase 2. These characteristics include, for example, the number of downstream probe signals included in the sequence, the duration of each probe signal, the duration of quiet periods between the probe signals, the transmit power level of each probe signal, and the bins or spectral range associated with each probe signal. Alternatively, the above mentioned parameters may be predefined, and the handshake session just signals or otherwise identifies the entry into the loop diagnostics mode.

The second phase includes five time periods of variable length ($t_i$; i=0 . . . 4). No transmissions occur during delay period 208, which lasts to seconds. This period allows transceivers 106 and 108 to prepare for the forthcoming diagnostic sequence. During period 212, which has a variable length of $t_1$, the transceiver 108 transmits probe signal R-PROBE-LD to transceiver 106. Recall that characteristics defining this probe signal were exchanged during phase 1, or were otherwise predefined. Generally, this probe signal allows transceiver 106 to measure upstream loop channel characteristics (e.g., on a subchannel basis).

R-PROBE-LD can be, for example, based on a REVERB type signal. R-PROBE-LD uses only the bins between (and including) the lowest bin and highest bin specified in a G.hs message exchanged in phase 1, or as specified by predefined loop diagnostic mode parameters. The other bins are skipped. In one embodiment, R-PROBE-LD uses a data pattern having the pseudo-random sequence, $d_n$ for n=1 to 512, as defined in ITU-T Recommendations G.992.1 and G.992.2 and repeated here:

| | |
|---|---|
| $d_n = 1$ | for n = 1 to 9 |
| $d_n = d_{n-4} \oplus d_{n-9}$ | for n = 10 to 512 |

In this embodiment, the bits are used as follows: the first pair of bits ($d_1$ and $d_2$) is used for the DC and Nyquist subcarriers (the power assigned to them is zero, so the bits are effectively ignored); then the first and second bits of subsequent pairs are used to define the $X_i$ and $Y_i$ data for each bin i, where i=1 to 255 as defined in Table 1. The data bits are mapped into a constellation by quadrature amplitude modulation (QAM). Note that alternative embodiments may employ other modulation and encoding schemes as will be apparent to one skilled in the art.

TABLE 1

Mapping of two data bits into a 4-QAM constellation

| $d_{2i+1}$, $d_{2i+2}$ | Decimal label | $X_i$, $Y_i$ |
|---|---|---|
| 0 0 | 0 | ++ |
| 0 1 | 1 | +− |
| 1 0 | 2 | −+ |
| 1 1 | 3 | −− |

The resulting R-PROBE-LD symbols can be transmitted, for example, at the transceiver 108 transmit power level for each of the subcarriers or bins, as specified in the phase 1 G.hs session. The transceiver 106 then receives R-PROBE-LD, and measures its power at the specified bins. As the transmit power is known by virtue of phase 1 (or as a predefined parameter), the loop loss for each of the specified bins can then be calculated (e.g., transmit power—received power).

As can be seen in FIG. 2, R-QUIET-LD of period 216 immediately follows R-PROBE-LD, and continues for $t_2$ seconds. During this time period, no signal is transmitted upstream or downstream. In the absence of any other signals, the transceiver 106 is able to measure the upstream noise PSD. Thus, the upstream SNR profile can be determined (e.g., receive signal PSD/noise PSD).

The C-PROBE-LD of period 220 immediately follows the R-QUIET-LD for $t_3$ seconds. The C-PROBE-LD is transmitted by the transceiver 106 so as to allow the transceiver 108 to measure downstream channel characteristics (e.g., on a subchannel basis). C-PROBE-LD can use the same data pattern and mapping as specified in the description of R-PROBE-LD. Additionally, as with the R-PROBE-LD, the C-PROBE-LD uses only the bins between (and including) the lowest bin and highest bin specified in a G.hs message of phase 1. The other bins are skipped. Transceiver 108 receives C-PROBE-LD and measures signal characteristics (e.g., received power and received signal PSD) so as to determine downstream loop conditions such as downstream loop loss.

The C-QUIET-LD of period 224 immediately follows the C-PROBE-LD for $t_4$ seconds. During this time period, no signal is transmitted upstream or downstream. In the absence of any other signals, the transceiver 108 is able to measure downstream noise PSD. Thus, the downstream SNR profile can be determined (e.g., receive signal PSD/noise PSD).

Note that during Phase 2, the order in which probe signals R-PROBE-LD, R-QUIET-LD, C-PROBE-LD and C-QUIET-LD are transmitted may be modified to ease implementation as necessary without adversely affecting the resultant loop diagnostics information. In addition, each of the probe signals R-PROBE-LD R-QUIET-LD, C-PROBE-LD and C-QUIET-LD may be a collection of one or more signals or data patterns to facilitate transition from one signal state to the other. Furthermore, one quiet period (e.g., R-QUIET-LD or C-QUIET-LD) can be eliminated if both receivers of the transceiver pair measure respective noise PSD during the same quiet period.

After C-QUIET LD, the system enters phase 3 of the loop diagnostic sequence, which includes a handshake session 228 (e.g., G.hs session). During this session, the transceivers 108 and 106 exchange loop diagnostic information gathered during phase 2.

Transceiver Unit

Figure 3:
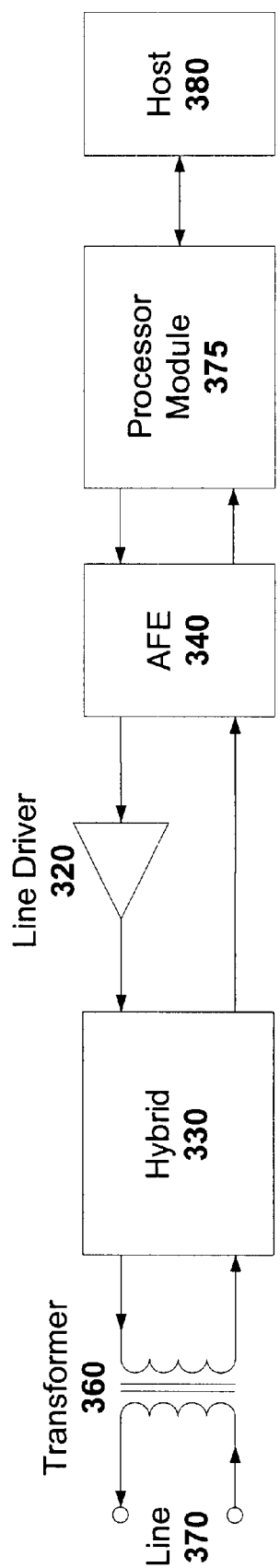
FIG. 3 is a block diagram of an ADSL modem adapted to perform loop diagnostics in accordance with one embodiment of the present invention.

FIG. 3 is a block diagram of an ADSL modem adapted to perform loop diagnostics in accordance with one embodiment of the present invention. The modem may be, for example, one of a number of modems included on a multiple port assembly in a central office. Alternatively, the modem may be a stand-alone modem at the central office, or at a customer's premises or other remote location. The modem includes transformer 360, hybrid 330, line driver 320, analog front end (AFE) 340, and processor module 375. Transformer 360 is coupled to the line 370, while the processor module 375 is coupled to a host 380. In one embodiment, where the modem is located at a remote terminal, host 380 may be an application running on a customer's personal computer. In another embodiment, where the modem is located at a central office, the host 380 may be a management entity or network operator.

Transformer 360 couples the line 370 to the circuitry of the modem, and provides electrical isolation between line 370 and the modem electronics and host 380. Hybrid 330 performs 2-to-4-wire conversion, which converts the bi-directional two-wire signal from the line 370 into two pairs of one-directional transmissions. One pair is for receiving and the other pair is for transmitting. AFE 340 typically includes an analog-to-digital (A/D) converter and a digital-to-analog (D/A) converter. The signal received by AFE 340 from hybrid 330 is converted from analog to digital by the A/D converter, and is provided to processor module 375. AFE 340 may further comprise a gain adjust module for optimizing signals sent to processor module 375. With regards to the transmit direction, data received from the host 380 is processed by processor module 375. Such data might be from a customer's data terminal equipment or from the telephone company's network. The digital output of processor module 375 is converted to its analog equivalent by the D/A converter in AFE 340. The output of AFE 340 is provided to line driver 320.

Processor module 375 is programmed or otherwise configured to effect a loop diagnostic mode in accordance with the principles of the present invention. Processor module 375 may perform a number of other functions as well. For example, processor module 375 can be programmed to perform modulation/demodulation, encoding/decoding, scrambling/descrambling, error detection (e.g., CRC check), framing/deframing, and other algorithm-based functions.

During loop diagnostic mode, probe signals can be transmitted onto line 370 by the modem. In one embodiment, samples of the transmitted probe signals are kept in a storage (e.g., EEPROM or other memory device) accessible by processor module 375. Upon receiving a request to initiate a loop diagnostic sequence, processor module 375 can access the samples from storage and provide them to AFE 340 for conversion to analog form. Alternatively, a signal generator module can be included in or otherwise triggered by processor module 375 to provide the probe signals. Processor module 375 can then provide the probing signals to AFE 340 for conversion to analog form. Regardless of the source of the probing signals, their analog equivalent is driven onto line 370 by line driver 320 by way of hybrid 330 and transformer 360.

Probe signals received by the modem are decoupled from the line 370 by transformer 360 and provided to processor module 375 by way of hybrid 330 and AFE 340.

Based on the received probe signals having known transmit characteristics, processor module 375 can then evaluate the line conditions and derive diagnostic information. In one embodiment, processor module 375 is a digital signal processor (DSP) that is programmed to carry out loop diagnostics in accordance with the principles of the present invention. In alternative embodiments, processor module 375 can be, for example, an ASIC or chip set, or a combination of a DSP and an ASIC, or other equivalent processing environments. Processor module 375 may be integrated with the modem as shown in FIG. 3, or may be operatively coupled to the modem (e.g., via one or more external port connections). Generally, processor module 375 analyzes the received probe signals having known transmit characteristics thereby allowing loop diagnostic information to be determined.

Loop Diagnostic Processor Module

Figure 4:
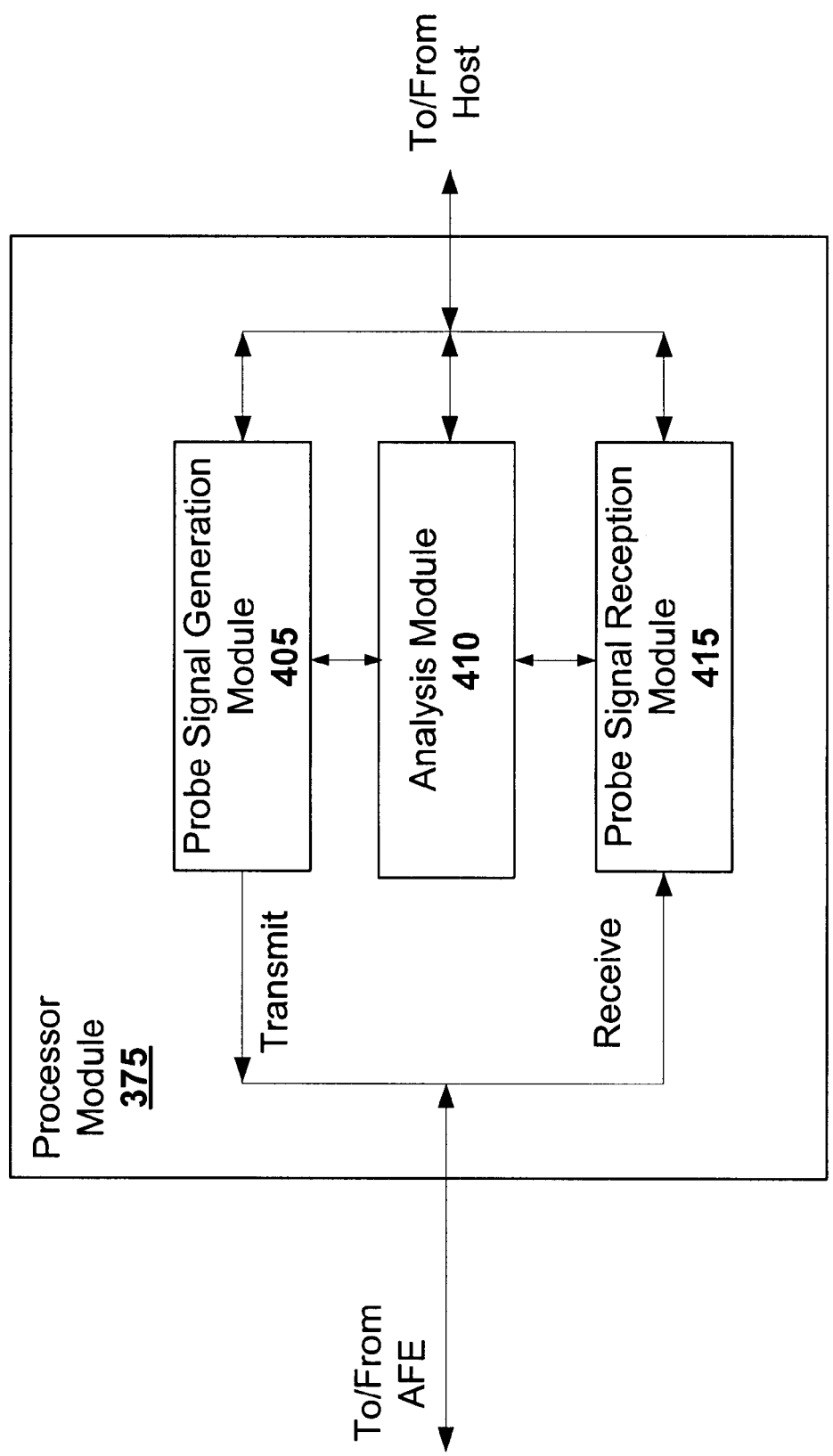
FIG. 4 is a block diagram of a loop diagnostic processor module in accordance with one embodiment of the present invention.

FIG. 4 is a block diagram of a loop diagnostic processor module in accordance with one embodiment of the present invention. This embodiment of processor module 375 includes a probe signal generation module 405, an analysis module 410, and a probe signal reception module 415. The analysis module 410 is in communication each module 405 and 415. For purposes of this discussion, assume that a processor module 375 is employed in each of a pair of transceivers (one local and one remote) communicatively coupled by a transmission medium. The functionality of each module 375 is the same in a complementary fashion in that each module is associated with incoming probe signals and outgoing probe signals. As such, the processor module 375 functionality will be discussed in terms of the local transceiver.

A control signal or "troubleshooting call" (e.g., software call or logic enable line) from the host can be used to trigger entry into the loop diagnostic mode. Alternatively, processor module 375 can self-initiate loop diagnostic mode after detecting, for example, a repeated link initialization failure. Likewise, processor module 375 can enter loop diagnostic mode after detecting that the loop diagnostic mode was initiated by the processor module 375 of a remote transceiver. The control signal can be provided to each of the modules 405, 410, and 415. Alternatively, the control signal can be provided to the analysis module 410, which can then communicate loop diagnostic mode status to the other modules. Regardless of the source of the triggering event, a loop diagnostic sequence is initiated.

Probe signal information is exchanged during phase 1 of the loop diagnostic sequence (unless it is otherwise predefined and stored, for example, in a memory included in the processor module). In one embodiment, probe signal reception module 415 is adapted to receive incoming probe signal characteristic information from the remote transceiver by way of the local AFE. Probe signal reception module 415 can then provide that information to the analysis module 410. Thus, transmit characteristics of incoming probe signals are known to the analysis module 410. Note that the probe signal reception module 415 can also be programmed or otherwise configured to detect that loop diagnostic mode was initiated by the remote node (e.g., by decoding a flag set in an overhead message or G.hs code point).

Likewise, probe signal generation module 405 is adapted to forward outgoing probe signal characteristic information to the remote transceiver by way of the local AFE. The probe signal generation module 405 can, for example, receive outgoing probe signal information from the analysis module 410, or can generate the information itself. Thus, characteristics of the outgoing probe signals are made known to the remote transceiver. In addition, probe signal generation module 405 is programmed or otherwise configured to inform the remote node when loop diagnostic mode has been locally initiated (e.g., by encoding a flag set in an overhead message or G.hs code point).

In phase 2 of the loop diagnostic sequence, probe signals are both received from the remote modem and transmitted to the remote modem. Assume a probe signal is received first. The received probe signal is provided to the probe signal reception module 415 by the local AFE. The probe signal reception module 415 is programmed or otherwise configured to measure characteristics'such at the received signal power and the received signal power and received signal PSD. In addition, the probe signal reception module 415 is adapted to measure the noise PSD. The received signal power, received signal PSD, and noise PSD can then be provided to the analysis module 410, which can then derive diagnostic information such as attenuation and SNR of the incoming channel or subchannels. Such diagnostic information can then be provided to the local host to assist, for instance, the network operator in troubleshooting, for example, a link initialization problem or a low data rate link. Note that probe signal reception module 415 can be further adapted to perform other functions such as decoding and descrambling.

With regards to transmitting a probe signal, the probe signal generation module 405 is programmed or otherwise configured to generate one or more outgoing probe signals having characteristics known to the remote transceiver. The known characteristics (e.g., transmit power per bin, transmit PSD, signal duration, applicable bins) can be provided by the analysis module 410, or by the generation module 405 itself. In one embodiment, the generated probe signals are REVERB type signals having a data pattern as previously discussed. Other types probe signals can be used here as well as will be apparent in light of this disclosure, and the present invention is not intended to be limited to any one type of probe signal. In addition, note that probe signal generation module 405 can be further adapted to perform functions such as encoding and scrambling.

Methodology.

Figure 5:
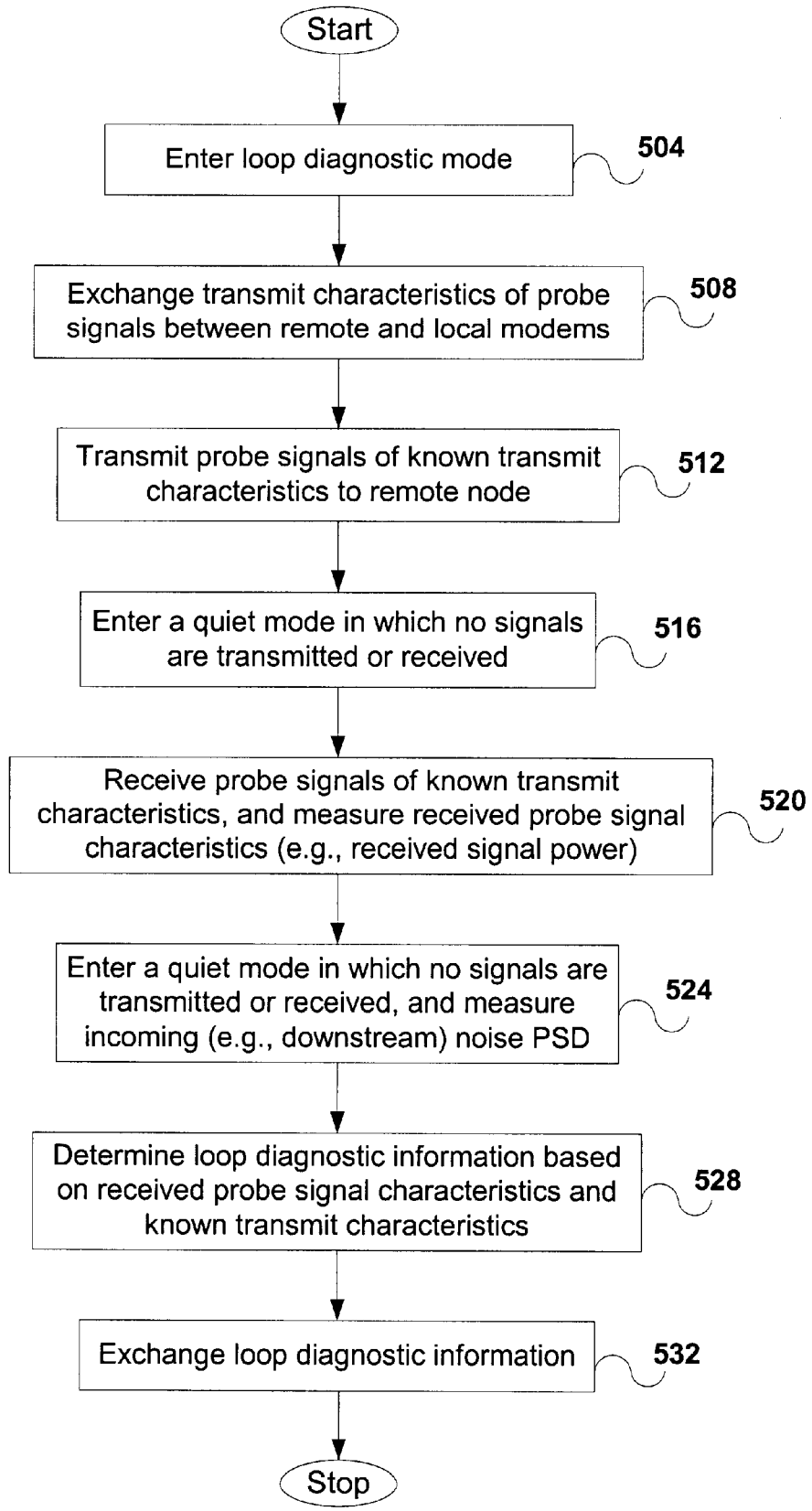
FIG. 5 is a flow chart illustrating a method for performing loop diagnostics in accordance with one embodiment of the present invention.

FIG. 5 is a flow chart illustrating a method of performing loop diagnostics in accordance with an embodiment of the present invention. This method may be implemented, for example, by a customer's modem having a processor module as described in reference to FIGS. 3 and 4. However, other implementations will be apparent in light of this disclosure.

The method begins 504 with entering a loop diagnostic mode. The command to enter the diagnostic mode may be automatically triggered, for example, by a repeated link initialization failure (e.g., after the third failed attempt to initialize the link, the diagnostic mode is entered by virtue of a software call issued by processor module 375). Alternatively, the command may come from a network operator, or a local host or application. The method proceeds with exchanging 508 transmit characteristics of probe signals that will be used in the loop diagnostic mode (if such characteristics are not already known). Thus, both local and remote modems are aware of each other's transmit probe signal characteristics. In one embodiment, the exchanging is carried out by an initial G.hs handshaking session or other handshaking procedure.

The method further includes transmitting 512 a probe signal of known characteristics to the remote node (e.g., central office). In one embodiment this probe signal is the R-PROBE-LD sequence as previously described. The method further includes entering 516 a quiet mode in which no signals are transmitted or received. This quiet mode allows a modem at the remote node to measure noise PSD associated with its incoming channel or subchannels (e.g., upstream noise PSD). Note that during this quiet mode, the modem at the local node can also measure noise PSD associated with its incoming channel or subchannels (e.g., downstream noise PSD). The method further includes receiving 520 a probe signal of known transmit characteristics, and measuring the probe signal's received characteristics (e.g., received signal power and received signal PSD for downstream direction). In one embodiment, this probe signal is the C-PROBE-LD sequence as previously discussed.

The method further includes entering 524 a quiet mode in which no signals are transmitted or received, and measuring incoming noise PSD (e.g., downstream noise PSD). Note that step 524 can be skipped if this noise PSD is measured in step 516. The method proceeds with determining 528 loop diagnostic information based on received probe signal characteristics and known transmit characteristics. In one embodiment, the loop diagnostic information that is determined includes SNR and loop loss associated with the channel or subchannels. The method further includes exchanging 532 the loop diagnostic information (which may include measured loop characteristics as well other derived information). In one embodiment, this exchange is carried out with a G.hs handshake session.

Figure 6:
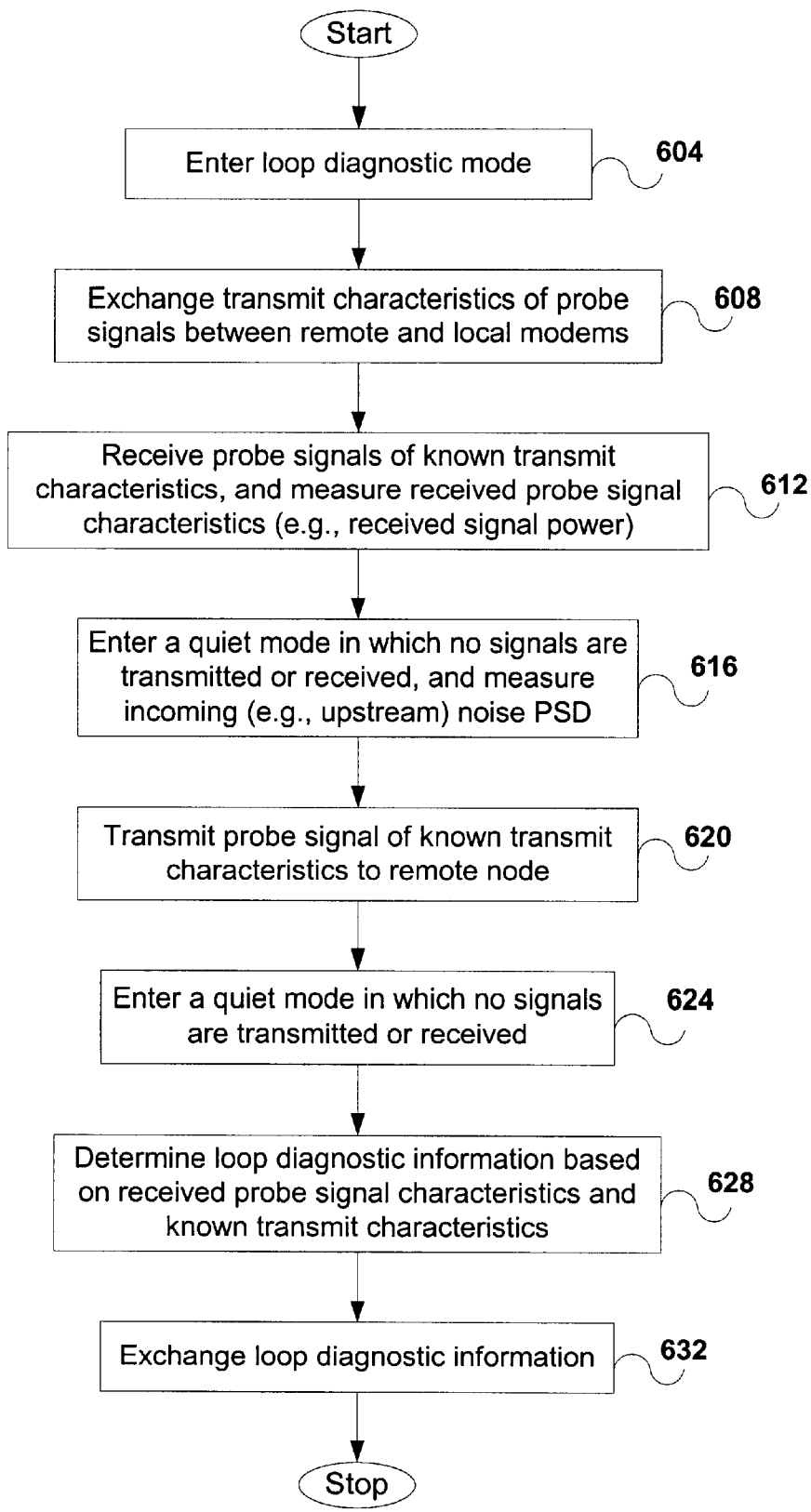
FIG. 6 is a flow chart illustrating a method for performing loop diagnostics in accordance with another embodiment of the present invention.

FIG. 6 is a flow chart illustrating a method of performing loop diagnostics in accordance with another embodiment of the present invention. This method may be implemented, for example, by a central office modem having a processor module as described in reference to FIGS. 3 and 4. However, other implementations will be apparent in light of this disclosure.

The method begins 604 with entering a loop diagnostic mode as previously explained. The method proceeds with exchanging 608 transmit characteristics of probe signals (if such characteristics are not already known) so that both local and remote modems are aware of each other's transmit probe signal characteristics. In one embodiment, the exchanging is carried out by an initial G.hs handshaking session or other handshaking procedure. The method further includes receiving 612 a probe signal of known transmit characteristics, and measuring the probe signal's received characteristics (e.g., received signal power and received PSD for the upstream direction). In one embodiment, this probe signal is the R-PROBE-LD sequence as previously described.

The method further includes entering 616 a quiet mode in which no signals are transmitted or received, and measuring noise PSD (e.g., downstream noise PSD and or upstream noise PSD). This quiet mode allows a modem at the remote node or modems at both ends to measure noise PSD associated with their incoming channel or subchannels. The method further includes transmitting 620 a probe signal of known transmit characteristics to the remote node (e.g., customer's premises). In one embodiment this probe signal is the C-PROBE-LD sequence as previously described. The method may further include with entering 624 a quiet mode in which no signals are transmitted or received. This quiet mode allows a modem at the remote node to measure noise PSD associated with its incoming channel or subchannels (e.g., downstream noise PSD). Again, this second quiet period can be eliminated by determining both upstream and downstream noise PSD in a single quiet period.

The method further includes determining 628 loop diagnostic information based on received probe signal characteristics and known transmit characteristics. In one embodiment, the loop diagnostic information that is determined includes SNR and loop loss associated with the channel or subchannels. The method proceeds with exchanging 632 the loop diagnostic information (which may include measured loop characteristics as well other derived information). In one embodiment, this exchange is carried out by a G.hs handshake session.

The foregoing description of the embodiments of the invention has been presented for the purposes of illustration and description. It is not intended to be exhaustive or to limit the invention to the precise form disclosed. Many modifications and variations are possible in light of this disclosure. For example, the initial handshaking session can be used to signal or otherwise request entry into the loop diagnostic mode (e.g., a G.hs loop diagnostic mode code point or message for signaling entry). It is intended that the scope of the invention be limited not by this detailed description, but rather by the claims appended hereto.

What is claimed is:

1. A method of performing loop diagnostics in a DSL system, the method comprising:
    entering a loop diagnostic mode;
    measuring incoming noise during a quiet mode where no signals are transmitted or received;
    receiving a probe signal having known transmit characteristics;
    measuring characteristics of the received probe signal; and
    determining loop diagnostic information based on received probe signal characteristics and known transmit characteristics.

2. The method of claim 1, further comprising a preliminary step of:
    exchanging transmit characteristics of the probe signal between remote and local modems thereby establishing the known transmit characteristics.

3. The method of claim 2, wherein the exchanging is carried out by an initial G.hs handshaking session.

4. The method of claim 1, further comprising:
    exchanging the loop diagnostic information between local and remote modems.

5. The method of claim 4, wherein the exchanging is carried out by a G.hs handshaking session.

6. The method of claim 1, further comprising:
    transmitting a second probe signal having known transmit characteristics to a remote modem.

7. The method of claim 6, wherein the second probe signal is one of R-PROBE-LD or C-PROBE-LD, and uses a data pattern having a pseudo-random sequence.

8. The method of claim 6, wherein the second probe signal is a collection of one or more data patterns.

9. The method of claim 1, wherein the probe signal is one of R-PROBE-LD or C-PROBE-LD, and uses a data pattern having a pseudo-random sequence.

10. The method of claim 1, wherein the probe signal is a collection of one or more data patterns.

11. The method of claim 1, wherein the diagnostic information includes at least one of attenuation, SNR, noise PSD, or received probe signal PSD associated with one or more subchannels.

12. The method of claim 1, wherein the loop diagnostic mode is entered in response to at least one of a repeated link initialization failure or a troubleshooting call.

13. The method of claim 1, wherein the known transmit characteristics include transmit power per subchannel, and the received probe signal characteristics include received power per subchannel.

14. The method of claim 1, further comprising:
    transmitting a second probe signal having known transmit characteristics to a remote node; and
    at the remote node:
        receiving the second probe signal for determining loop diagnostic information based on received second probe signal characteristics and known transmit characteristics, and
        measuring incoming noise PSD during another quiet mode where no signals are transmitted or received.

15. The method of claim 1, further comprising:
    transmitting a second probe signal having known transmit characteristics to a remote node; and
    at the remote node:
        receiving the second probe signal for determining loop diagnostic information based on received second probe signal characteristics and known transmit characteristics, and
        measuring incoming noise PSD during the quiet mode.

16. A modem for performing loop diagnostics in a DSL system, the modem comprising:
    a probe signal reception module adapted to receive a probe signal having known transmit characteristics, and to measure received characteristics of the probe signal, the probe signal reception module further adapted to measure incoming noise during a quiet mode where no signals are transmitted or received; and
    an analysis module in communication with the probe signal reception module, the analysis module adapted to determine loop diagnostic information based on received probe signal characteristics and known transmit characteristics.

17. The modem of claim 15, further comprising:
    a probe signal generation module in communication with the analysis module, the probe signal generation module adapted to transmit a second probe signal having known transmit characteristics to a remote modem, and to enter a quiet mode where no signals are transmitted or received thereby allowing the remote modem to measure its incoming noise PSD.

18. The modem of claim 17, wherein the second probe signal is one of R-PROBE-LD or C-PROBE-LD, and uses a data pattern having a pseudo-random sequence.

19. The modem of claim 17, wherein the second probe signal is a collection of one or more data patterns.

20. The modem of claim 15, wherein the known transmit characteristics are one of predefined or established during an initial diagnostic mode handshaking session.

21. The modem of claim 15, wherein the loop diagnostic information is provided to a remote modem during a diagnostic mode handshaking session, and includes at least one of attenuation, SNR, noise PSD, or received probe signal PSD associated with one or more subchannels.

22. The modem of claim 15, wherein the probe signal is one of R-PROBE-LD or C-PROBE-LD, and uses a data pattern having a pseudo-random sequence.

23. The modem of claim 15, wherein the probe signal is a collection of one or more data patterns.

24. The modem of claim 15, wherein the modem enters loop diagnostic mode in response to at least one of a repeated link initialization failure, a troubleshooting call, or a message in a handshaking session.

25. The modem of claim 15, wherein the known transmit characteristics include transmit power per subchannel, and the received probe signal characteristics include received power per subchannel.

26. A method of performing loop diagnostics in an ADSL system, the method comprising:
   entering a loop diagnostic mode in response to at least one of a repeated link initialization failure or a troubleshooting call;
   receiving a probe signal having known transmit characteristics including transmit power per subchannel;
   measuring received characteristics of the probe signal including received signal power per subchannel;
   measuring incoming noise PSD during a quiet mode where no signals are transmitted or received; and
   determining loop diagnostic information based on received probe signal characteristics and known transmit characteristics.

* * * * *

UNITED STATES PATENT AND TRADEMARK OFFICE
CERTIFICATE OF CORRECTION

PATENT NO. : 6,725,176 B1
DATED : April 20, 2004
INVENTOR(S) : Guozhu Long et al.

It is certified that error appears in the above-identified patent and that said Letters Patent is hereby corrected as shown below:

Title page,
Item [73], Assignee, should read -- Centillium Communications, Inc. --

Column 10,
Line 55, each occurrence of "claim 15" should read -- claim 16 --.

Column 11,
Lines 1, 4, 9, 12, 14, and 18, each occurrence of "claim 15" should read -- claim 16 --.

Signed and Sealed this

Thirteenth Day of July, 2004

JON W. DUDAS
*Acting Director of the United States Patent and Trademark Office*